US010733379B2

(12) United States Patent
Bostick et al.

(10) Patent No.: US 10,733,379 B2
(45) Date of Patent: Aug. 4, 2020

(54) COGNITIVE DOCUMENT ADAPTATION

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 15/477,799

(22) Filed: Apr. 3, 2017

(65) Prior Publication Data

US 2018/0285339 A1 Oct. 4, 2018

(51) Int. Cl.
G06F 40/284 (2020.01)
G06F 16/31 (2019.01)
G06F 16/33 (2019.01)
G06F 40/247 (2020.01)
G06N 5/02 (2006.01)
G06F 16/332 (2019.01)
G06N 5/04 (2006.01)
G06F 40/253 (2020.01)

(52) U.S. Cl.
CPC .......... G06F 40/284 (2020.01); G06F 16/313 (2019.01); G06F 16/3329 (2019.01); G06F 16/3344 (2019.01); G06F 40/247 (2020.01); G06F 40/253 (2020.01); G06N 5/02 (2013.01); G06N 5/04 (2013.01)

(58) Field of Classification Search
CPC .................................................... G06F 16/313
See application file for complete search history.

(56) References Cited

U.S. PATENT DOCUMENTS

| 8,862,670 | B1 | 10/2014 | Ancin et al. | |
|---|---|---|---|---|
| 9,367,538 | B2 | 6/2016 | Dua et al. | |
| 2003/0215067 | A1* | 11/2003 | Ordille | G06Q 10/107 379/88.13 |
| 2004/0215479 | A1* | 10/2004 | Dorsey | G06Q 10/107 709/206 |

(Continued)

OTHER PUBLICATIONS

Kirchhoff, K., "A Comparison of Classification techniques for the Automatic Detection of Error Corrections in Human-Computer Dialogues". Retrieved from the Internet< URL: http://melodi.ee.washington.edu/people/katrin/Papers/naacl01.pdf>, 8 pgs.

(Continued)

*Primary Examiner* — Daniel C Washburn
*Assistant Examiner* — Timothy Nguyen
(74) *Attorney, Agent, or Firm* — James Nock, Esq.; George S. Blasiak, Esq.; Heslin Rothenberg Farley & Mesiti PC

(57) ABSTRACT

Methods, computer program products, and systems are presented. The methods include, for instance: obtaining a document by an author and a designation of the recipient of the document. A lexical preference of the recipient is identified and the document is analyzed and compared against the lexical preference of the recipient. Discrepancies from the lexical preference on the document is adapted by replacing a term in the document with a comparable term preferred by the recipient.

20 Claims, 7 Drawing Sheets

(56) References Cited

U.S. PATENT DOCUMENTS

| | | | |
|---|---|---|---|
| 2005/0137843 A1* | 6/2005 | Lux | G06F 17/27 |
| | | | 704/2 |
| 2006/0069728 A1 | 3/2006 | McEvilly et al. | |
| 2010/0223341 A1 | 9/2010 | Manolescu et al. | |
| 2010/0274752 A1* | 10/2010 | Gonzalez | G06F 17/274 |
| | | | 706/50 |
| 2012/0272143 A1 | 10/2012 | Gillick | |
| 2014/0106318 A1* | 4/2014 | Wright | G09B 19/00 |
| | | | 434/219 |
| 2015/0058428 A1* | 2/2015 | Caskey | H04L 51/02 |
| | | | 709/206 |
| 2016/0294746 A1* | 10/2016 | Boothroyd | H04W 4/21 |

OTHER PUBLICATIONS

"In Synch: Language Style Matching" [retrieved on Feb. 22, 2017]. Retrieved from the Internet< URL:http://www.utpsyc.org/synch/>, Online Research Consortium from Universities Around the World, 1 pg.

Mell, Peter, et al., "The NIST Definition of Cloud Computing", NIST Special Publication 800-145, Sep. 2011, Gaithersburg, MD, 7 pgs.

* cited by examiner

COGNITIVE DOCUMENT ADAPTATION

TECHNICAL FIELD

The present disclosure relates to cognitively customizing documents for a particular reader, and more particularly to methods, computer program products, and systems for adapting the lexical level and style of a document to another lexical level and style that is preferred by the particular reader to improve readability, appeal, and persuasiveness of the document.

BACKGROUND

In modern communication landscape, written messages and documents are frequently used to serve numerous purposes in a wide range of circumstances. Authors intends to write readable and persuasive messages and documents, but the authors may not have proper understanding on stylistic preferences, knowledge on a subject matter, and other aspects of a target audience.

SUMMARY

The shortcomings of the prior art are overcome, and additional advantages are provided, through the provision, in one aspect, of a method. The method for cognitively adapting a document for a recipient includes, for example: obtaining, by one or more processor, the document of an author and a designation of the recipient; identifying a lexical preference of the recipient; analyzing the document against the identified lexical preference; determining that discrepancies exist between lexical style of the document and the lexical preference of the recipient; and selecting one or more comparable term corresponding to one or more term of the document, wherein the comparable term has a meaning similar to the term of the document and the comparable term fits the lexical preference of the recipient.

Additional features are realized through the techniques set forth herein. Other embodiments and aspects, including but not limited to computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Figure 1:
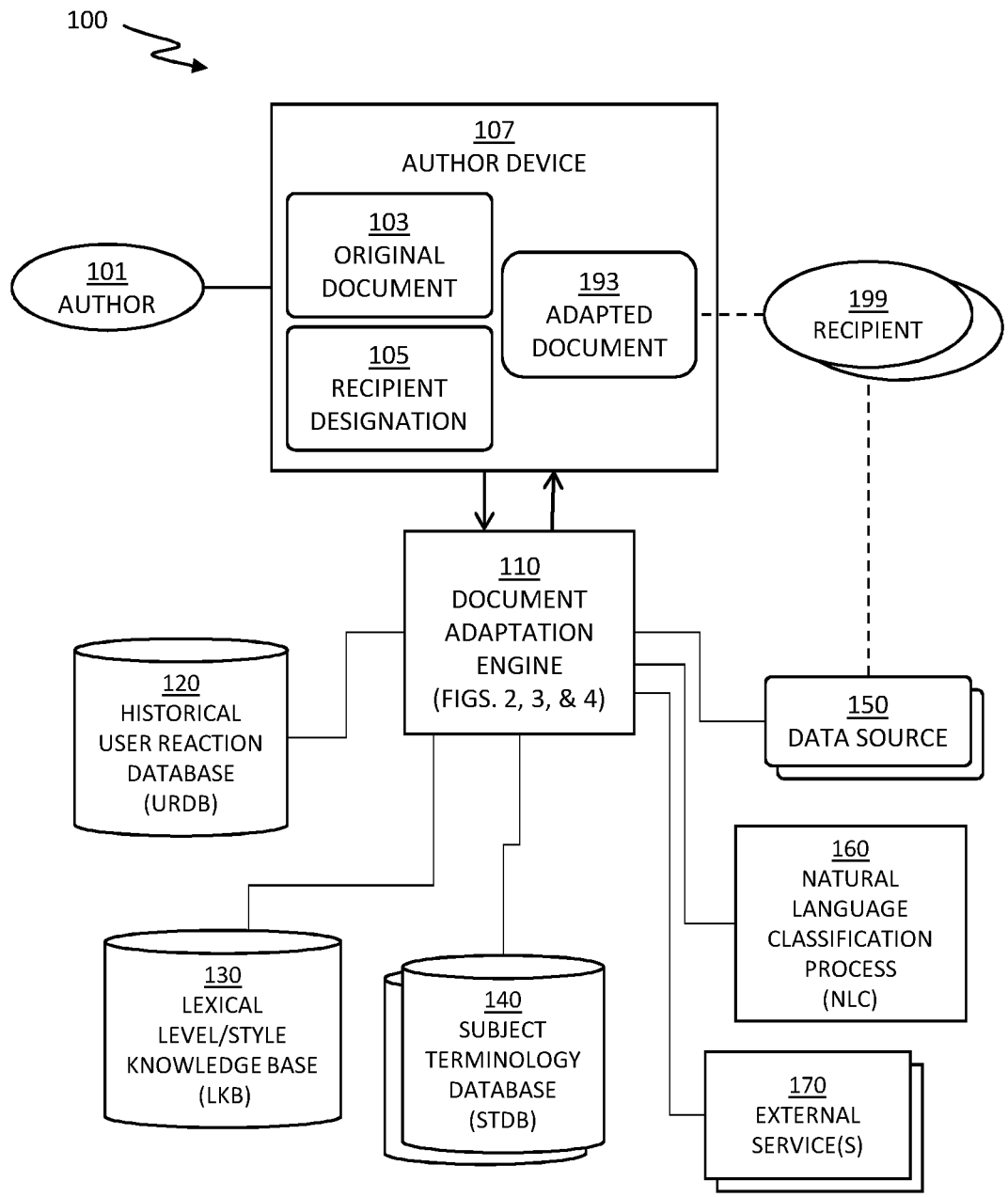
FIG. 1 depicts a system for cognitively adapting a document for a particular recipient, in accordance with one or more embodiments set forth herein.

FIG. 1 depicts a system 100 for cognitively adapting a document for a particular recipient, in accordance with one or more embodiments set forth herein.

The system 100 includes an author 101, an author device 107, a document adaptation engine 110, and a recipient 199. The author 101 communicates with the document adaptation engine 110 via the author device 107. The author 101 creates and/or identifies an original document 103 and configures a recipient designation 105 by use of the author device 107. The author device 107 may be any type of computer system with an input/output device such as a tablet and an electronic pen/a touchscreen, etc., which is used for marking the original document 103, in part or in entirety, and for putting in the recipient designation 105. The recipient designation 105 provided by the author 101 may be attached to the original document 103 as a metadata tag for an individual recipient identified by the recipient designation 105, and/or a group recipient to which the recipient designation 103 applicable. In certain embodiments of the present invention, the recipient designation 105 also may be input by use of a recipient list, from which the author 101 may choose the recipient 199. In this specification, the term recipient indicates an individual or a group for whom the author 101 intended a document of any types to be received and understood, or further persuaded to act on the document as in cases of commercial messages and other requests/petitions.

The document adaptation engine 110 produces an adapted document 193 by cognitively adapting the lexical level/style of the original document 103 to the lexical level/style preferred by the recipient 199 identified by the recipient designation 105. Accordingly, the adapted document 193 would have better readability and appeal for, as well as be more persuasive to, the recipient 199 than the original document 103 while conveying the same content of the original document 103. In this specification, the term "lexical level/style" indicates a general lexical knowledge and tone/style of a written material, a general tendency in written materials by a person reflective of personality, as well as a level of knowledge on any specific subject dealt in the original document 103. Also in this specification, the term "lexical preference" indicates preference of an individual or group recipient as to the lexical level/style aforementioned. In certain embodiments of the present invention, the adapted document 193 may be configured to elaborate definitions and/or acronyms for certain words and phrases including, particularly, technical terms, in order to improve understanding of the recipient 199 if the recipient 199 is less knowledgeable than the author 101, as indicated in knowledge level attributes of the lexical level/styles of both the author 101 and the recipient 199. In this specification, the term "term" collectively represents both word and phrase appearing in documents, and "terms" may be used interchangeably with "words and phrases". In certain embodiments of the present invention, a limited number of lexical level/style categories may be preconfigured, as in {basic, medium, high} according to word complexity for general vocabulary as preferred by each user, or {95%, 70%, 50%, 15%} according to respective population percentiles who would likely to know a certain word in relation with complexity of terms, etc. Examples of the styles of writing may include, but not limited to, {plain, embellished}, {neutral, friendly, technical}, etc. An example of the lexical level/style of a user may be LexicalPreference (User=RoseRoe)={email: 70%-friendly; IMs: 95%-friendly; formalDocs: 50%-technical (subject=system integration; level-high)}.

The document adaptation engine 110 presents the adapted document 193 in the author device 107, from which the author 101 may provide a feedback on the adapted document 193 by either accepting or discarding respective replacements appearing in the adapted document 193. Detailed operations of the document adaptation engine 110 are presented in FIGS. 2 through 4, and corresponding description. The document adaptation engine 110 may run on a separate computing platform providing document adaptation services for subscribers. Details on computer systems and computing platform are presented in FIGS. 5, 6, 7 and corresponding description.

The document adaptation engine 110 is coupled to a historical user reaction database (URDB) 120, a lexical level/style knowledge base (LKB) 130, one or more subject terminology database (STDB) 140, one or more data source 150, a natural language classification process (NLC) 160, and one or more external service 170. Respective coupling represented by solid lines in FIG. 1 indicates functional interconnectivity amongst various components, and may not be understood as direct physical connection between two distinctive components. The data source 150 originates various types of natural language contents coming into the document adaptation engine 110, including stream data from email servers, feed from news servers, instant messages, postings and comments from subscribed social media sites, and document files from individuals. In this specification, the term document indicates any kind of data having natural language content as shown in a few examples of the incoming documents.

The NLC 160 cognitively classifies words and phrases appearing in incoming documents based on lexical levels and styles as well as discovering any replaceable candidate words/phrases such as synonyms of various levels and styles, expansions for acronyms, etc. All replaceable candidate words/phrases are also classified into the respective lexical levels/styles, of the classified words and phrases from the incoming documents such that the document adaptation engine 110 may readily make suggestions in adapting the original document 103 to the lexical level/style preference of the recipient 199. For example, the document adaptation engine 110 may make a suggestion to replace an informal wording to a formal wording for a recipient who does not react favorably to informal wordings, or make another suggestion to fully expand an acronym for another recipient who does not use many acronyms in writing documents.

The lexical level/style knowledge base (LKB) 130 stores respective lexical level/style preferences of one or more recipient including the recipient 199. Each of the recipient may be an individual, a group, or a demographic. Each of the respective lexical level/style preferences corresponds to respective recipient amongst the recipient. Each lexical level/style preference represents a lexical level/style for documents that is preferred by a corresponding recipient, as well as the level of knowledge that the recipient has on any applicable subject of the original document 103. The lexical level/style stored in the LKB 130 may be determined according to preferred vocabulary as well as lexical characteristics of words in a subject language such as formality, sociolinguistic register, sophistication level, written/spoken distinction, etc. In preparation of the LKB 130, words appearing in all subject documents incoming from the data source 150 may be classified into one of many predefined lexical level/styles by use of the natural language classification process (NLC) 160. The NLC 160 also may associate relationships amongst words and phrases for the document adaptation engine 110 such as synonyms across lexical levels, such that adapting the lexical level/style of the original document 103 by scaling up words and phrases for more sophisticated recipients as well as by scaling down words and phrases for less sophisticated recipients would be readily available in both directions. The synonyms or other comparable candidate words and phrases used in adapting the original document 103 may be obtained by use of real time discoveries via the external service 170 on existing lexical databases, or may be maintained in the STDB 140 corresponding to a relevant subject of the original document 103.

Documents from the data source 150 and reactions to respective lexical level/style of the documents by the recipient are analyzed by various tools including the NLC 160, a sentiment analysis service from the external service 170, to categorize words/phrases into a preconfigured number of lexical levels/styles. Then the analyzed reactions are associated with the respective lexical level/style and stored in the historical user reaction database (URDB) 120. The information from the URDB 120 is later utilized to determine the respective preference of each recipient. The reactions data in the URDB 120 would cumulate over time, and accordingly, the document adaptation engine 110 may become more accurate with the lexical level/style preference for each recipient.

In certain embodiments of the present invention, the lexical level/style preferences may be grouped into several categories according to a level/style score. For a group recipient, an average of individual level/style scores of all members of the group may be included in the attributes. For respective words/phrases, cross-level/style correspondency of each word/phrase may be established or otherwise accessible in real time such that a replacement word/phrase necessary for adapting one lexical level/style group from another lexical level/style group would be readily located, optionally via one of the external service 170.

The subject terminology database (STDB) 140 may be established for each topic/subject such that meanings particular to certain topic/subject may be distinctively identified instead of using general meanings of words, as in Golf terms, Computer terms, etc.

The external service 170 provides continuous real time maintenance on the URDB 120, the LKB 130, and the STDB 140, by monitoring recipient activities and reactions to the documents located on the data source 150. The external service 170 also may automatically learn interrelations of writing styles, reactions, and lexical level/style preference by analyzing incoming documents and messages from the data source 150. Commercially available knowledge base services for mobile computing platforms may be utilized as the external service 170.

Conventionally in written communication, authors may not properly communicate with intended audience because the authors do not appreciate how well the readers would understand the written material, whether or not the readers would like the written material and respond to the writing as intended by the authors, etc. When the written communication has a purpose to achieve, as in most business communications, educational texts, etc., presenting a material more readable and appealing to the readers would greatly improve the efficiency and success of the written communication, as provided by the document adaptation engine 110.

Figure 2:
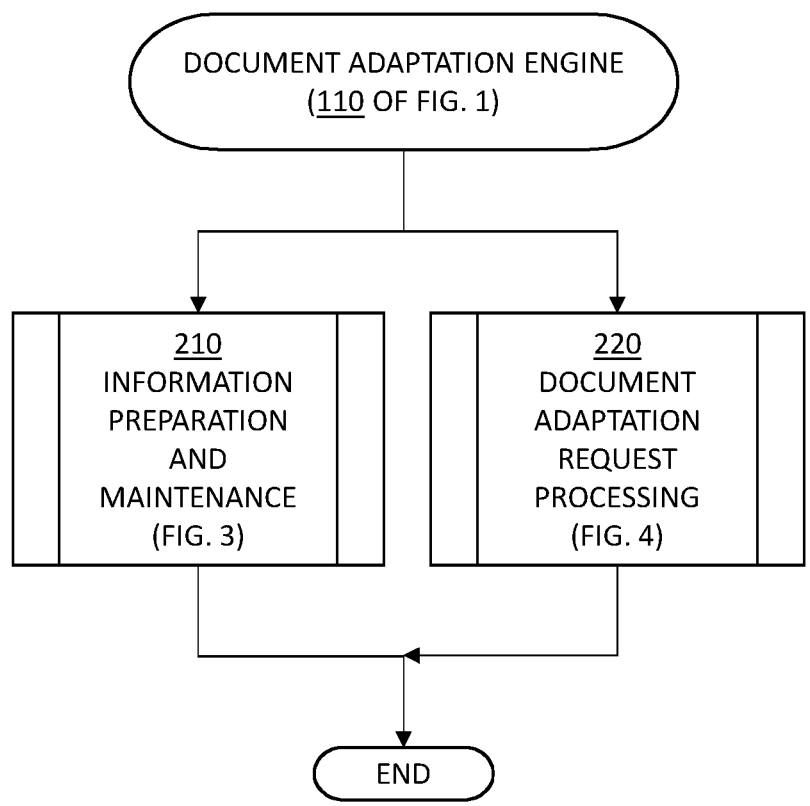
FIG. 2 depicts a flowchart of an overall process performed by the document adaptation engine, in accordance with one or more embodiments set forth herein.

FIG. 2 depicts a flowchart of an overall process performed by the document adaptation engine 110 of FIG. 1, in accordance with one or more embodiments set forth herein.

In block 210, the document adaptation engine 110 prepares and maintains the historical user reaction database (URDB) 120, the lexical level/style knowledge base (LKB) 130, and the subject terminology database (STDB) 140. Detailed operations of block 210 by the document adaptation engine 110 are presented in FIG. 3 and corresponding description. The document adaptation engine 110 iteratively performs block 210 until the document adaptation engine 110 terminates.

In block 220, the document adaptation engine 110 processes a request for adapting a document to a preferred lexical level/style for a recipient, by use of the URDB 120, the LKB 130, and the STDB 140, as initialized and maintained from block 210. Detailed operations of block 220 by the document adaptation engine 110 are presented in FIG. 4 and corresponding description. The document adaptation engine 110 iteratively performs block 220 until the document adaptation engine 110 terminates.

Figure 3:
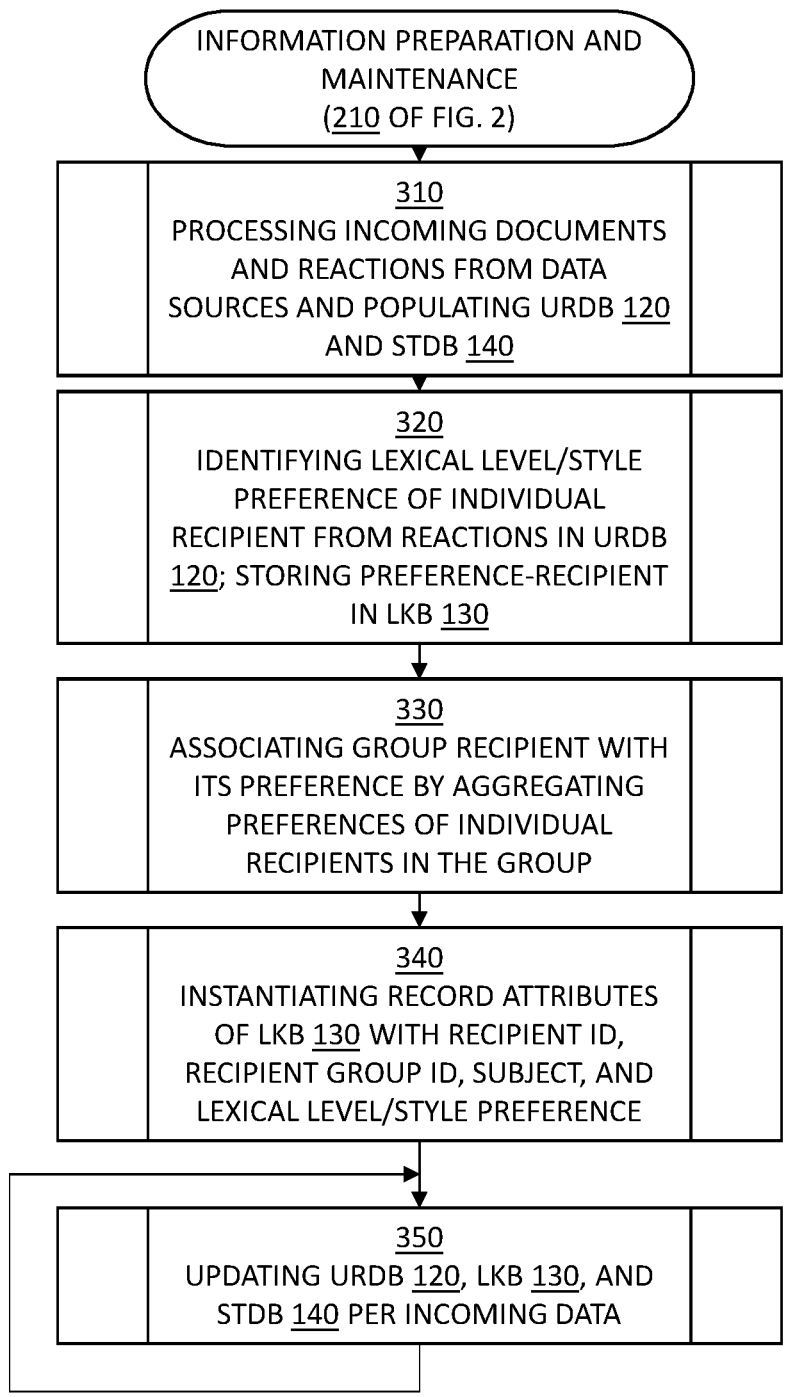
FIG. 3 depicts a detailed flowchart for the document adaptation engine setting up information necessary for document adaptation, in accordance with one or more embodiments set forth herein.

FIG. 3 depicts a detailed flowchart for the document adaptation engine 110 of FIG. 1 performing block 210 of FIG. 2, setting up information necessary for document adaptation, in accordance with one or more embodiments set forth herein.

In block 310, the document adaptation engine 110 populates the historical user reaction database (URDB) 120 with reactions to the documents from the data source 150 as provided by users. The term "users" may include all users of the system 100, who may be an author at some time in writing documents or a recipient in reading other documents at other time. The incoming documents as well as the reactions from the data source 150 are processed by use of natural language processing, which may be employed as one of the external service 170 of FIG. 1, and analyzed by the natural language classification process (NLC) 160. The document adaptation engine 110 differentiates incoming documents by types of the documents such as emails, instant messages, formal documents, social media postings and comments, etc., in assessing reactions by each user because the same user may react differently to the type of documents, depending on the nature of the communication. Accordingly, the document adaptation engine 110 may cumulate knowledge on what kind of respective reactions may be associated with certain types of incoming documents. For example, a user would respond differently with distinctive words to an interview request email from a potential employer as in "I greatly appreciate the opportunity to meet you in person . . . " and to an instant message from friends to get together as in "Sure, on my way!"

Examples of the reactions may include, but not limited to, up or down vote on a certain posting, written comment and/or reply on another posting, etc. The written comments may be analyzed by another external service of sentiment analysis and classified to, for example, one of positive, neutral, or negative reactions. The document adaptation engine 110 also populates the subject terminology database (STDB) 140 with respective subject/topic terminology as collected from the data sources 150. The data sources 150 may be, not are not limited to, any web documents to which a type of reaction by the users may be provided such as voting/commenting for the URDB 120, documents/description on subjects/topics for the STDB 140, etc.

In certain embodiments of the present invention, the document adaptation engine 110 may be configured to proceed to block 320 once a threshold amount of document-reaction data has been accumulated. In certain embodiments of the present invention, the document adaptation engine 110 may be configured to proceed to block 320 by initializing the reaction data with a system default such as average from the age group. The threshold amount of document-reaction data in the URDB 120 is deemed the amount of data in sufficient to infer lexical level/style preference for a certain individual recipient.

In block 320, the document adaptation engine 110 identifies respective lexical level/style preferences for each individual recipient from the reaction data in the URDB 120, and stores the preferences associated with the respective individual recipients in the lexical level/style knowledge base (LKB) 130. Then the document adaptation engine 110 proceeds with block 330.

The document adaptation engine 110 may be configured to track the lexical level/style of one or more user who is likely to be a recipient such that the lexical level/style of such tracked user may cumulate and be kept up-to-date in the LKB 130 over time, as described below in block 350.

In block 330, the document adaptation engine 110 identifies respective lexical level/style preferences for each group recipient by aggregating all lexical level/style preferences for each individual recipient who belongs to the group. Then the document adaptation engine 110 stores the preferences associated with the respective group recipients in the lexical level/style knowledge base (LKB) 130, such that the document adaptation engine 110 may estimate a lexical level/style preference of a new user by use of a group membership, even the preference of the new user is not known to the system 100 with the historical user reactions data. The document adaptation engine 110 may configure more than one group recipient for each individual recipient, such that one individual recipient may contribute to estimate preferences for a certain age group, a certain occupation, a geographical demographic, etc. Then the document adaptation engine 110 proceeds with block 340.

In certain embodiments of the present invention, group membership of individual recipients may be determined based on various categories typically used in statistical analysis on human behaviors, such as occupation, age, geographical location, etc. Further, another type of group membership of individual recipients may be determined by associations amongst users that may be observed over time. For example, the document adaptation engine 110 may learn that a team called EAM, indicating "electric accounting machines", exists within a business organization by trend/tendency with respect to content of documents communicated amongst a group of people. The document adaptation engine 110 may observe that a first user sends emails discussing "business rules extraction", that a second user sends emails and documents elaborating the subject of "system integration", and that a third user texts on the topic of "legacy understanding". All three users individually identify the group associations to EAM in corporate employee profile pages, respectively. Accordingly, the document adaptation engine 110 may infer that the team EAM deals with the topics of business rules extraction, system integration, and legacy understanding, and records the topics as sub-categories of and/or subjects relevant to EAM. In occasions wherein the term "EAM" appears in incoming documents afterward, the document adaptation engine 110 may make suggestions to elaborate the term "EAM" with the recorded sub-categories and/or relevant subjects accordingly.

In block 340, the document adaptation engine 110 instantiates attributes of a record corresponding to each recipient in the LKB 130 with a Recipient ID, one or more Recipient group ID, a Subject, and a Lexical level/style preference. For example, for an individual user Robin Hood, the record in the LKB 130 may include attributes of ID=34567, GroupID1=Male35-49, GroupID2=Job seeker, Subject=System Integration, LexicalPreference:formalDocs=50%, wherein the LexicalPreference may be further configured for the Subject of "System Integration" as in LexicalPreference:formalDocs(Subject=System Integration; level-high), indicating the user Robin Hood is highly knowledgeable in the subject of "System Integration" and uses terms having complexity familiar to 50% of population in formal documents on the subject. Then the document adaptation engine 110 proceeds with block 350.

In block 350, the document adaptation engine 110 continuously monitors and processes incoming data from the data source 150 and updates the URDB 120, the LKB 130, and the STDB 140 accordingly. The document adaptation engine 110 may perform block 220 of FIG. 2 and block 350 concurrently, as the URDB 120, the LKB 130, and the STDB 140 are ready for processing a document adaptation request. In certain embodiments of the present invention, the document adaptation engine 110 monitors and updates the knowledge base contents of the URDB 120, the LKB 130, and the STDB 140 by use of one of the external service 170. The document adaptation engine 110 iterates block 350 while the system 100 runs.

For example, wherein the document adaptation engine 110 tracks a user "Joe", the document adaptation engine 110 initially would configure the lexical level/style of Joe as a system default, which may be an average for all users or for a group of users to which the user belongs. In block 350, if the document adaptation engine 110 obtains a calendar entry for a conference indicating that the user "Joe" is leading a project on system integration. The document adaptation engine 110 may register "system integration" as one of subject/topic attribute for lexical level/style records, responsive to cumulative content of incoming documents including the calendar entry. The document adaptation engine 110 may further adjust the lexical level/style of Joe with a subject-knowledge level attribute "system integration-high" as inferred from the aforementioned calendar entry.

Figure 4:
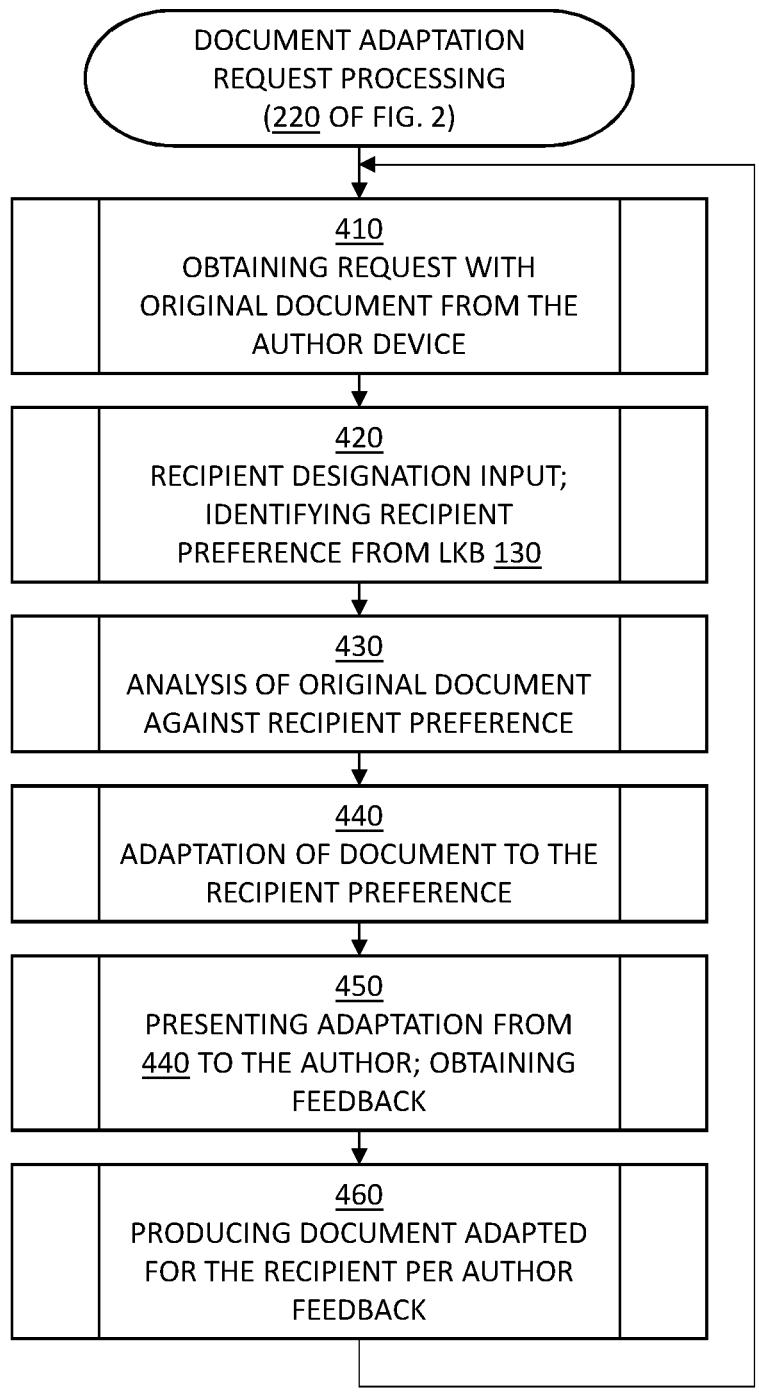
FIG. 4 depicts a detailed flowchart for the document adaptation engine processing a request to adapt a document, in accordance with one or more embodiments set forth herein.

FIG. 4 depicts a detailed flowchart for the document adaptation engine 110 of FIG. 1 performing block 220 of FIG. 2, processing a request to adapt a document, in accordance with one or more embodiments set forth herein.

Prior to block 410, the document adaptation engine 110 had completed blocks 310 through 340, and the URDB 120, the LKB 130, and the STDB 140 are ready for processing the request to adapt the document.

In block 410, the document adaptation engine 110 obtains a document adaptation request accompanying the original document 103 from the author 101 via the author device 107. The original document 103 may be written directly by using an application/authoring tool on the author device 107 and/or may be imported by locating the original document 103 stored in a storage device coupled to the author device 107. Then the document adaptation engine 110 proceeds with block 420.

As in processing of the incoming documents, the document adaptation engine 110 may apply differentiated weight schemes depending on the type of the original document 103. For example, wherein the original document is an email to the recipient, the document adaptation engine 110 counts more heavily on the lexical level/style preference of emails to and from the recipient rather than other types of documents. Similarly, in case where the original document is a formal document, the document adaptation engine 110 would focus on formal document preferences of the recipient rather than other types of documents such as emails and instant messages.

In block 420, the document adaptation engine 110 obtains the recipient designation 105 from the author 101 via the author device 107, for a selected portion of the original document 103 to be directed. The selected portion of the original document 103 may vary in range and length, from single word to the entire document. The document adaptation engine 110 identifies, from the LKB 130, the recipient 199 that fits the recipient designation 105 and the lexical level/style preference associated with the recipient 199, either by name of an individual recipient or by membership to a group recipient. Then the document adaptation engine 110 proceeds with block 430.

In certain embodiments of the present invention, the recipient designation 105 may be provided as the author 101 writes a recipient name on a touch screen of the author device 107 with an electronic pen. In certain embodiments of the present invention, the document adaptation engine 110 may be configured to present a drop-down menu with predefined recipient names responsive to the author 101 selecting a certain portion of the original document 103. The drop-down menu also may have a choice to add recipient by selecting from available recipients or writing/typing in a new recipient name.

In block 430, the document adaptation engine 110 processes the selected portion of the original document 103 by use of the NLC 160 and other natural language processing tools available and determines the lexical level/style appearing in the selected portion of the original document 103. The selected portion of the original document 130 would be processed in a unit configured for the NLC 160, such as words, phrases, sentences, and paragraphs, etc. The document adaptation engine 110 subsequently compares the lexical level/style of the original document 103 against the lexical level/style preference associated with the recipient 199 as identified from block 420. Depending on the implementations of the NLC 160, the lexical level/style may vary in comprehensiveness and the number of levels/styles, which is not within the scope of the embodiments of the present invention. Then the document adaptation engine 110 proceeds with block 440.

For example, if the original document 103 reveals that the author is more knowledgeable on the subject/topic than the recipient, as often in the case of instruction manuals, educational materials, seminar presentations, the document adaptation engine 110 may determine that the lexical level/style of the original document needs to be scaled down to accommodate the recipient by avoiding jargons, acronyms, industry specific phrases and/or technical terms without proper introduction because the recipient may have difficulty understanding the original documents as is. For another example, if the original document is targeting a recipient just as knowledgeable as the author on the subject/topic, then the document adaptation engine 110 may determine that the lexical level/style needs to avoid basic information that may be obvious to the recipient.

In block 440, the document adaptation engine 110 adapts the lexical level/style of the original document 103 to the lexical level/style preference associated with the recipient 199 by replacing words and phrases of the original document 103 with synonyms or other comparable candidate words and phrases preferred by the recipient 199. The document adaptation engine 110 performs the adaptation of the original document to the preference of the recipient 199, responsive to determining that there are discrepancies between the lexical level/style expressed in the original document 103 and the lexical level/style preference of the recipient 199. Then the document adaptation engine 110 proceeds with block 450.

In certain embodiments of the present invention, the document adaptation engine 110 may include preconfigured adaptation rules to streamline the adaptation process in case many documents need to be automatically processed without interruption, or with a delayed feedback from the author 101. In the same embodiments, the document adaptation engine 110 proceeds with block 460.

In certain embodiments of the present invention, the document adaptation engine 110 may compare the selected portion of the original document 103 with another document of a similar type that the identified recipient had positively responded in the past such that the selected portion of the original document 103 may be adapted similar to the compared document. Also in the same embodiments of the present invention, the document adaptation engine 110 may compare a general complexity of vocabulary used in the selected portion of the original document 103 with a complexity of vocabulary preferred by the identified recipient such that the complexity of the vocabulary in the adapted document may assimilate the complexity of vocabulary preferred by the recipient.

In block 450, the document adaptation engine 110 presents, to the author 101, the adaptation of the lexical level/style of the original document 103 to the lexical level/style preference of the recipient 199 as made in block 440. The document adaptation engine 110 may further present the lexical level/style preference of the recipient 199 as recorded in the LKB 130 and the reaction data from the URDB 120 such that the author 101 may verify the adaptation of the lexical level/style would positively affect the readability, appeal, and persuasiveness of the original document 103 for the recipient 199. Subsequently the document adaptation engine 110 receives feedback from the author 101 on the respective adaptations, that is, each replacement of terms in the original document 103 to respectively corresponding comparable terms. The document adaptation engine 110 may be configured, for example, to automatically adapt the entire original document 103 or a designated portion of the original document 103, to override adaptation by the feedback from the author 101, to provide more than one suggestion for a certain adaptation, etc. Then the document adaptation engine 110 proceeds with block 460.

In block 460, the document adaptation engine 110 creates the adapted document 193 for the recipient 199 according to the feedback from the author 101 as obtained in block 450, or the preconfigured adaptation rules, and subsequently produces the adapted document 193 to the author 101. Then document adaptation engine 110 concludes processing the document adaptation request received from block 410, and loops back to block 410 for another document adaptation request.

In an exemplary request for document adaptation, the original document is a resume by which the author JOE seeks an employment. JOE extends the effort in seeking an employment by uploading the resume to a jobsite having many jobseekers and potential employers exchange information. The jobsite has access to the document adaptation engine 110 and submits the resume of JOE for processing.

In block 410, the document adaptation engine 110 obtains the resume of the author JOE along with a document adaptation request. In the resume, the author JOE describes himself as an "Integration Consultant and Developer", and seeks a position for integration consultants.

In block 420, the document adaptation engine 110, via the jobsite, designates recipient as human resource (HR) personnel of technology companies who would screen the resume. The document adaptation engine 110 identifies preference of the recipient HR personnel as words and phrases used in job descriptions of the open positions in respective technology companies, based on the data from URDB 120, LKB 130, and the STDB 140. The document adaptation engine 110 further identifies that knowledge level of the recipient HR personnel on subject of "Integration/System integration" would be lower than the author JOE.

In block 430, the document adaptation engine 110 compares texts of the resume and the job descriptions on many hiring posts, including synonyms and words associated with "Integration" and "Developer". Words relevant to the interested terms of integration and developer may be established by use of, for example, the bag-of-words language model, in which relevant terms may be readily identified and located. The document adaptation engine 110, responsive to the comparison and search, discovers that a FIRST Company has an opening for an expert on "Legacy Modernization", as presented in the job description of the posting.

In block 440, the document adaptation engine 110 adapts the resume of the author JOE to the recipient HR personnel of the FIRST Company by replacing "Integration Consultant" with "Legacy Modernization Expert" determining that the phrases are comparable and interchangeable but would be preferred by the recipient HR personnel, according to the content recorded in the URDB 120 and the STDB 140.

In block 450, the document adaptation engine 110, optionally via the jobsite, presents the suggestion from block 440 to the author JOE for a feedback. Upon being informed with the position with the FIRST Company and suggested changes on the resume, the author JOE agrees with the adaptation of the resume to the HR personnel of the FIRST Company.

In block 460, the document adaptation engine 110 produces the adapted resume according to the feedback by the author JOE from block 460, and concludes processing requested in block 410.

Certain embodiments of the present invention may offer various technical computing advantages, including cognitive lexical level and style determination based on extensive real time natural language content collection, which is processed by natural language processing, natural language classification, machine learning, content analysis, and sentiment analysis. Certain embodiments of the present invention may cognitively determine individual lexical preferences of users on natural language content based on respective types of the content, levels and styles of terms used in the natural language content, past reactions to certain levels and styles of natural language content per types, as well as levels of knowledge on certain subjects as represented in the natural language content. Certain embodiments of the present invention may aggregate individual lexical preferences to infer a lexical preference of a group to which individual recipients may belong, as well as infer an individual lexical preference by use of group membership of the individual for known lexical preference for the group. Certain embodiments of the present invention may compare the lexical preference shown in an original document and the lexical preference of an intended recipient, and adapt terms of the original document to the lexical preference of the intended recipient by replacing terms of the original document with candidate terms that fit the lexical preferences of the intended recipient, in order to improve readability, appeal, and persuasiveness of the original document for the intended recipient. Synonyms as well as various levels of the candidate terms for document adaptation may be discovered by search lexical database as well as subject terminologies as published in specialty dictionaries, web glossaries, etc.

Figure 5:
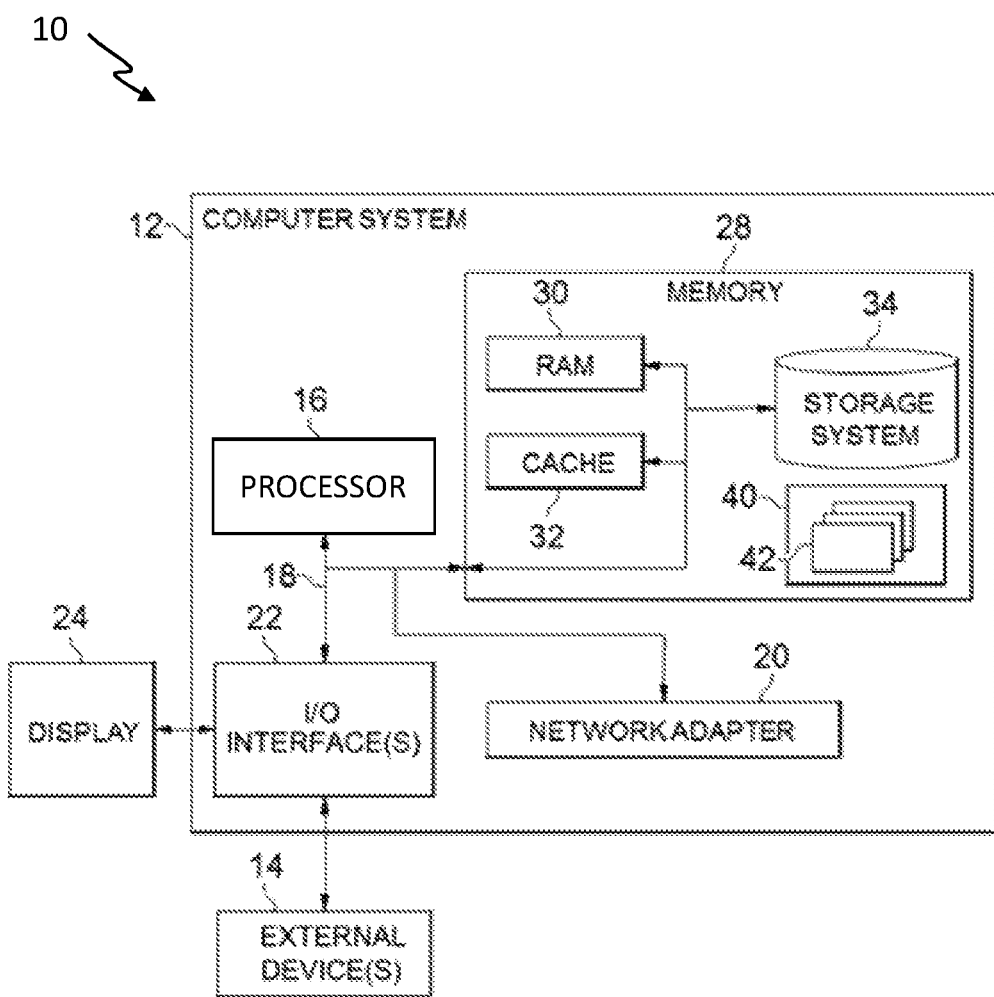
FIG. 5 depicts a cloud computing node according to an embodiment of the present invention.
Figure 6:
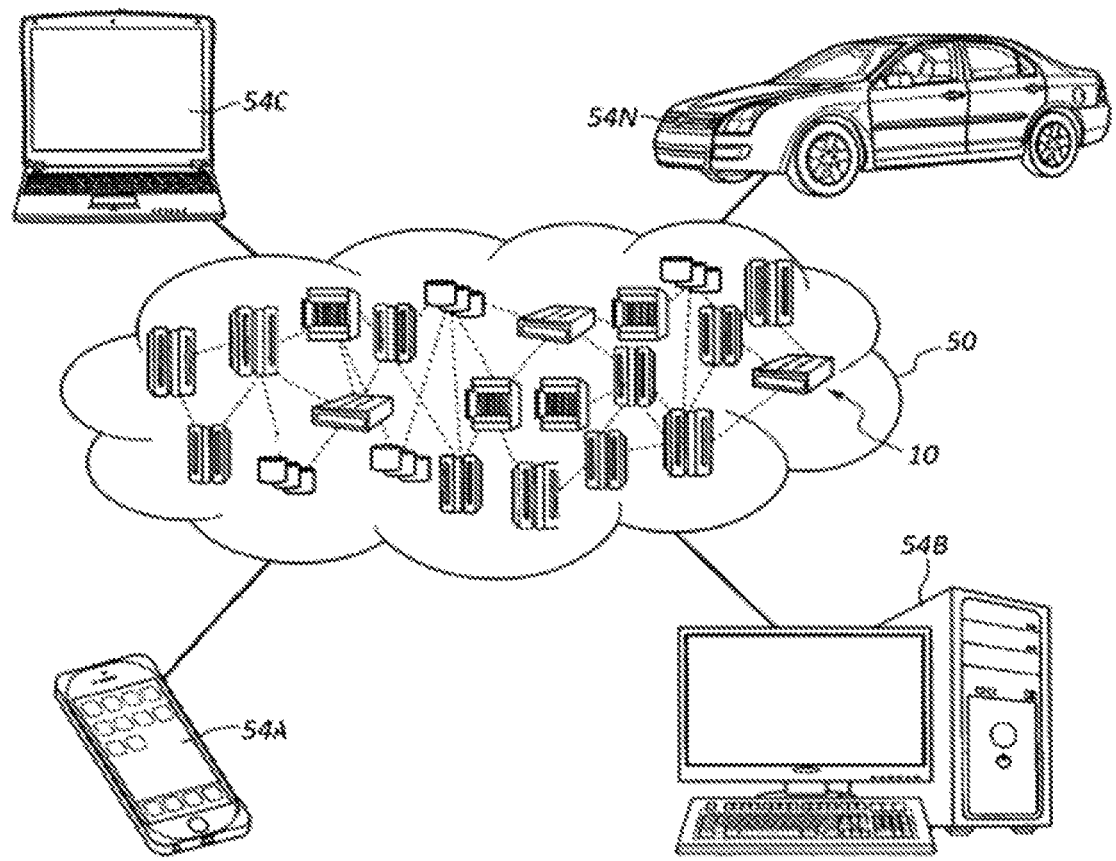
FIG. 6 depicts a cloud computing environment according to an embodiment of the present invention.
Figure 7:
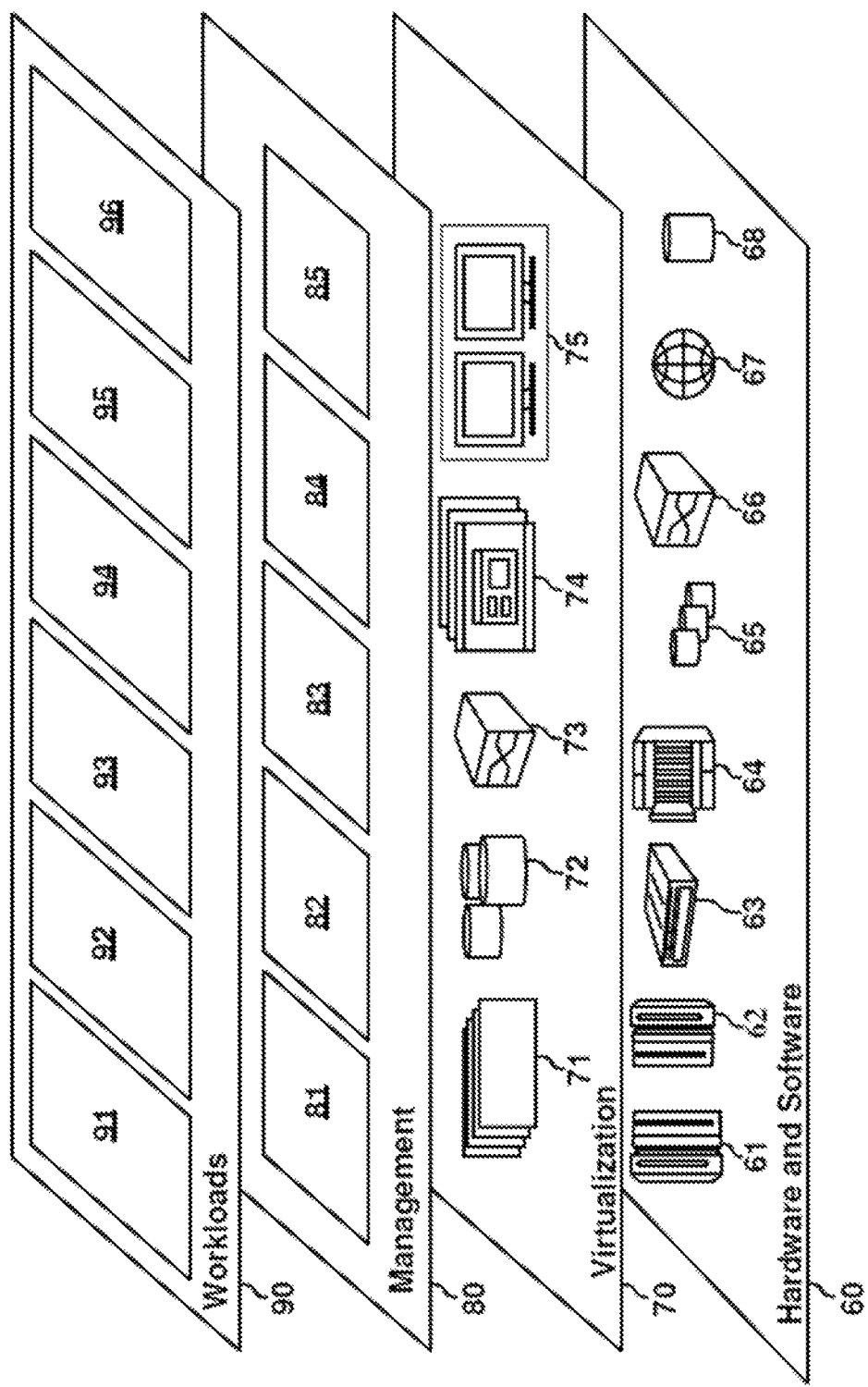
FIG. 7 depicts abstraction model layers according to an embodiment of the present invention.

FIGS. 5-7 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a computer system/cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 5, computer system 12 in cloud computing node 10 is shown in the form of a general-purpose computing device. The components of computer system 12 may include, but are not limited to, one or more processors 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. Each of the operating system, one or more application programs, other program processes, and program data or some combination thereof, may include an implementation of the document adaptation engine 110 of FIG. 1. Program processes 42, as in the document adaptation engine 110 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processors, external disk drive arrays, RAID systems, tape drives, and data archival storage systems, etc.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components for the document adaptation engine 96, as described herein. The processing components 96 can be understood as one or more program 40 described in FIG. 4.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A system comprising:
a memory;
one or more processor in communication with the memory; and
program instructions executable by the processor via the memory to perform a method comprising:
storing in a knowledgebase for a plurality of users a data record that includes a name attribute value, a subject matter attribute value, a lexical knowledge level attribute value and style attribute value, wherein the lexical knowledge level attribute value for a user is assigned in dependence on a percentage of persons within a population who are familiar with words of a vocabulary of the user;
iteratively processing new text based content of the plurality of users to update the respective data records in the knowledgebase for the plurality of users;
obtaining a document from an author and a designation of a recipient;
identifying a lexical preference of the recipient with use of the knowledgebase, wherein a user record of the knowledgebase includes a record of the recipient;
analyzing the document against the identified lexical preference;
determining with use of the knowledgebase that discrepancies exist between lexical style of the document and the lexical preference of the recipient; and
selecting one or more comparable term corresponding to one or more term of the document, wherein the comparable term has a meaning similar to the term of the document and the comparable term fits the lexical preference of the recipient, wherein a knowledgebase user record of the knowledgebase includes a record of the author, wherein the method includes ascertaining with use of the knowledgebase that a lexical knowledge attribute value of the author exceeds a lexical knowledge attribute value of the recipient;
responsively to the ascertaining with use of the knowledgebase that the lexical knowledge attribute value of the author exceeds a lexical knowledge attribute value of the recipient, removing terms from the obtained document obtained from the author; and
wherein the removing terms from the obtained document obtained from the author, responsively to the ascertaining with use of the knowledgebase that the lexical knowledge attribute value of the author exceeds a lexical knowledge attribute value of the recipient, includes performing the removing terms of the obtained document obtained from the author to scale down a complexity of the document obtained from the author for presentment of an adapted document to the recipient; and
presenting the adapted document to the recipient.

2. The system of claim 1,
wherein the obtaining the designation of the recipient includes examining data entered by the author of the obtained document into a user interface, the entered data entered by author into the user interface specifying an identifier of the recipient,
wherein the method includes subsequent to the selecting one or more comparable term corresponding to one or more term of the document,
(a) presenting a first term of the one or more selected comparable term of the obtained document to the author for approval,
(b) presenting a second term of the one or more selected comparable term of the obtained document to the author for approval,
(c) receiving from author a first approval indication that the first term is approved by the author of the obtained document for entry into an adapted document for presentment to the recipient,
(d) receiving from author a second rejection indication that the second term is not approved by the author of the obtained document for entry into an adapted document for presentment to the recipient, (e) providing an adapted document for presentment to the recipient, wherein the providing is performed so that based on the first approval indication received from the author, the first term is included in the adapted document for presentment to the recipient, wherein the providing is further performed so that based on the second rejection indication received from the author the second term is not included in the adapted document for presentment to the recipient, wherein the method further includes (f) presenting the adapted document adapted from the obtained document obtained from the author to the recipient.

3. The system of claim 1, wherein the iteratively processing new text based content of the plurality includes iteratively updating data records for the users in an historical reactions database, wherein the iteratively updating data records for the users in an historical reactions database for the plurality of users includes classifying received documents by type and recording data including type classification data on documents reacted to by users, as well as data indicating reactions to users in reaction to receiving received documents, wherein the recording of a reaction of a certain user to a presented document presented to the certain user for storing reaction data of the certain user into the knowledgebase includes (i) subjecting a text based response message of the certain user to sentiment analysis and (ii) identifying a positive sentiment associated to the text based response message based on the sentiment analysis, and (iii) associating a positive reaction for the certain user to the presented document based on the identifying the positive sentiment associated to the text based response message based on the sentiment analysis, wherein the method includes (a) ascertaining that the obtained document obtained from the author is of a certain type (b) discovering with use of the historical reactions database that the recipient has reacted positively to a certain historical document of the certain type, (c) identifying one or more attribute of the certain historical document, (d) providing an adapted document adapted from the obtained document obtained from the author for presentment to the recipient so that that adapted document includes the one or more attribute, and (e) presenting the adapted document adapted from the obtained document obtained from the author to the recipient.

4. The system of claim 1, wherein the storing in a knowledgebase for a plurality of users a data record includes performing the storing so that the data record for respective users of the plurality of users further includes a group identifier attribute value that specifies an enterprise project group association of the user, and a group lexical knowledge level attribute value for the enterprise project group, wherein providing the group lexical knowledge level attribute value for the enterprise project group includes aggregating lexical knowledge level attribute values for group members of the group, wherein the identifying a lexical preference of the recipient includes identifying a group identifier attribute value that specifies an enterprise project group association of the recipient as recorded within the knowledgebase and a group lexical knowledge level attribute value for the recipient as recorded within the knowledgebase, wherein the method includes providing an adapted document adapted from the obtained document obtained from the author for presentment to the recipient using (i) the group identifier attribute value that specifies an enterprise project group association of the recipient as recorded within the knowledgebase, and (ii) group lexical knowledge level attribute value for the recipient as recorded within the knowledgebase so that the adapted document has a complexity level in dependence group lexical knowledge level attribute value for the recipient, the complexity level indicative of a population percentage having familiarity with terms of the adapted document, wherein the method includes presenting the adapted document adapted from the obtained document obtained from the author to the recipient.

5. The system of claim 1, wherein the iteratively processing new text based content of the plurality of users includes iteratively updating data records for the users in an historical reactions database, wherein the iteratively updating data records for the users in the historical reactions database for the plurality of users includes differentiating and classifying documents presented to users as well as response messages by users by type of document and recording data including document type classification data on documents reacted to by users and document type classification data of response messages by users, wherein the iteratively updating data records for the users in the historical reactions database for the plurality of users further includes recording in the historical reactions database data indicating reactions to users in reaction to receiving presented documents, wherein the identifying a lexical preference of the recipient with use of the historical reactions database includes (a) determining that the obtained document obtained from author is of a certain type of document and (b) applying a weighing scheme to weigh reaction data of the recipient so that the identified lexical preference of the recipient is more dependent on historical data of the historical reactions database for the recipient associated to documents of the certain type than on historical data of the historical reactions database for the recipient associated to documents other than the certain type.

6. The system of claim 1, wherein the obtaining the designation of the recipient includes examining data entered by the author of the obtained document into a user interface, the entered data entered by author into the user interface specifying an identifier of the recipient, wherein the iteratively processing new text based content of the plurality of users includes iteratively updating data records for the users in an historical reactions database, wherein the iteratively updating data records for the users in the historical reactions database for the plurality of users includes differentiating and classifying documents presented to users as well as response messages by users by type of document and recording data including document type classification data on documents reacted to by users and document type classification data of response messages by users, wherein the iteratively updating data records for the users in the historical reactions database for the plurality of users further includes recording in the historical reactions database data indicating reactions to users in reaction to receiving presented documents, wherein the identifying a lexical preference of the recipient with use of the historical reactions database includes (a) determining that the obtained document obtained from author is of a certain type of document and (b) applying a weighing scheme to weigh reaction data of the recipient so that the identified lexical preference of the recipient is more dependent on historical data of the historical reactions database for the recipient associated to documents of the certain type than on historical data of the historical reactions database for the recipient associated to documents other than the certain type, wherein the recording of a reaction of a certain user to a presented document presented to the certain user for storing reaction data of the certain user into the knowledgebase includes (i) subjecting a text based response message of the certain user to sentiment analysis and (ii) identifying a positive sentiment associated to the text based response message based on the sentiment analysis, and (iii) associating a positive reaction for the certain user to the presented document based on the identifying the positive sentiment associated to the text based response message based on the sentiment analysis, wherein the method includes (A) ascertaining that the obtained document obtained from the author is of a certain type (B) discovering with use of the historical reactions database that the recipient has reacted positively to a certain historical document of the certain type, (C) identifying one or more attribute of the certain historical document, (D) providing an adapted document adapted from the obtained document obtained from the author for presentment to the recipient so that that adapted document includes the one or more attribute, wherein the storing in a knowledgebase for a plurality of users a data record includes performing the storing so that the data record for respective users of the plurality of users further includes a group identifier attribute value that specifies an enterprise project group association of the user, and a group lexical knowledge level attribute value for the enterprise project group, wherein providing the group lexical knowledge level attribute value for the enterprise project group includes aggregating lexical knowledge level attribute values for group members of the group, wherein the identifying a lexical preference of the recipient includes identifying a group identifier attribute value that specifies an enterprise project group association of the recipient as recorded within the knowledgebase and a group lexical knowledge level attribute value for the recipient as recorded within the knowledgebase, wherein the method includes providing an adapted document adapted from the obtained document obtained from the author for presentment to the recipient using (I) the group identifier attribute value that specifies an enterprise project group association of the recipient as recorded within the knowledgebase, and (II) group lexical knowledge level attribute value for the recipient as recorded within the knowledgebase so that the adapted document has a complexity level in dependence group lexical knowledge level attribute value for the recipient, the complexity level indicative of a population percentage having familiarity with terms of the adapted document, wherein the method includes presenting the adapted document adapted from the obtained document obtained from the author to the recipient, wherein the method includes subsequent to the selecting one or more comparable term corresponding to one or more term of the document, presenting a first term of the one or more selected comparable term of the obtained document to the author for approval, presenting a second term of the one or more selected comparable term of the obtained document to the author for approval, receiving from author a first approval indication that the first term is approved by the author of the obtained document for entry into an adapted document for presentment to the recipient, receiving from author a second rejection indication that the second term is not approved by the author of the obtained document for entry into an adapted document for presentment to the recipient, providing an adapted document for presentment to the recipient, wherein the providing is performed so that based on the first approval indication received from the author, the first term is included in the adapted document for presentment to the recipient, wherein the providing is further performed so that based on the second rejection indication received from the author the second term is not included in the adapted document for presentment to the recipient, wherein the method further includes presenting the adapted document adapted from the obtained document obtained from the author to the recipient.

7. The system of claim 1,
wherein the obtaining the designation of the recipient includes examining data entered by the author of the obtained document into a user interface, the entered data entered by author into the user interface specifying an identifier of the recipient.

8. The system of claim 1,
wherein the obtaining the designation of the recipient includes examining data entered by the author of the obtained document into a user interface, the entered data entered by author into the user interface specifying an identifier of the recipient,
wherein the method includes subsequent to the selecting one or more comparable term corresponding to one or more term of the document, presenting a first term of the one or more selected comparable term of the obtained document to the author for approval.

9. The system of claim 1, the identifying comprising:
discovering past reactions to one or more type of natural language content by the recipient from a historical user reaction database;
determining correlations amongst respective types of the natural language content, respective complexity of terms appearing in the respective types of the natural language content, and respective reactions to each type of the natural language content;
assigning the lexical preference of the recipient with the types of the natural language content and the complexity of terms that respectively corresponding to positive reaction of the recipient.

10. The system of claim 1, wherein the lexical preference further comprise a subject and associated knowledge level on the subject of the recipient, wherein terms specifically relevant to the subject is available from a subject terminology database, wherein the subject and the associated knowledge level on the subject of a group to which the recipient is a member is determined by aggregating respective subjects and associated knowledge levels of respective members of the group.

11. A computer implemented method comprising:
storing in a knowledgebase for a plurality of users a data record that includes a name attribute value, a subject matter attribute value, a lexical knowledge level attribute value and style attribute value, wherein the lexical knowledge level attribute value for a user is assigned in dependence on a percentage of persons within a population who are familiar with words of a vocabulary of the user;
iteratively processing new text based content of the plurality of users to update the respective data records in the knowledgebase for the plurality of users;
obtaining a document from an author and a designation of a recipient;

identifying a lexical preference of the recipient with use of the knowledgebase, wherein a user record of the knowledgebase includes a record of the recipient;

analyzing the document against the identified lexical preference;

determining with use of the knowledgebase that discrepancies exist between lexical style of the document and the lexical preference of the recipient; and selecting one or more comparable term corresponding to one or more term of the document, wherein the comparable term has a meaning similar to the term of the document and the comparable term fits the lexical preference of the recipient, wherein a knowledgebase user record of the knowledgebase includes a record of the author, wherein the method includes ascertaining with use of the knowledgebase that a lexical knowledge attribute value of the author exceeds a lexical knowledge attribute value of the recipient;

responsively to the ascertaining with use of the knowledgebase that the lexical knowledge attribute value of the author exceeds a lexical knowledge attribute value of the recipient, removing terms from the obtained document obtained from the author; and wherein the removing terms from the obtained document obtained from the author, responsively to the ascertaining with use of the knowledgebase that the lexical knowledge attribute value of the author exceeds a lexical knowledge attribute value of the recipient, includes performing the removing terms of the obtained document obtained from the author to scale down a complexity of the document obtained from the author for presentment of an adapted document to the recipient; and presenting the adapted document to the recipient.

12. The computer implemented method of claim 11, wherein the obtaining the designation of the recipient includes examining data entered by the author of the obtained document into a user interface, the entered data entered by author into the user interface specifying an identifier of the recipient, wherein the method includes subsequent to the selecting one or more comparable term corresponding to one or more term of the document, (a) presenting a first term of the one or more selected comparable term of the obtained document to the author for approval, (b) presenting a second term of the one or more selected comparable term of the obtained document to the author for approval, (c) receiving from author a first approval indication that the first term is approved by the author of the obtained document for entry into an adapted document for presentment to the recipient, (d) receiving from author a second rejection indication that the second term is not approved by the author of the obtained document for entry into an adapted document for presentment to the recipient, (e) providing an adapted document for presentment to the recipient, wherein the providing is performed so that based on the first approval indication received from the author, the first term is included in the adapted document for presentment to the recipient, wherein the providing is further performed so that based on the second rejection indication received from the author the second term is not included in the adapted document for presentment to the recipient, wherein the method further includes (f) presenting the adapted document adapted from the obtained document obtained from the author to the recipient.

13. The computer implemented method of claim 11, wherein the iteratively processing new text based content of the plurality includes iteratively updating data records for the users in an historical reactions database, wherein the iteratively updating data records for the users in an historical reactions database for the plurality of users includes classifying received documents by type and recording data including type classification data on documents reacted to by users, as well as data indicating reactions to users in reaction to receiving received documents, wherein the recording of a reaction of a certain user to a presented document presented to the certain user for storing reaction data of the certain user into the knowledgebase includes (i) subjecting a text based response message of the certain user to sentiment analysis and (ii) identifying a positive sentiment associated to the text based response message based on the sentiment analysis, and (iii) associating a positive reaction for the certain user to the presented document based on the identifying the positive sentiment associated to the text based response message based on the sentiment analysis, wherein the method includes (a) ascertaining that the obtained document obtained from the author is of a certain type (b) discovering with use of the historical reactions database that the recipient has reacted positively to a certain historical document of the certain type, (c) identifying one or more attribute of the certain historical document, (d) providing an adapted document adapted from the obtained document obtained from the author for presentment to the recipient so that that adapted document includes the one or more attribute, and (e) presenting the adapted document adapted from the obtained document obtained from the author to the recipient.

14. The computer implemented method of claim 11, wherein the storing in a knowledgebase for a plurality of users a data record includes performing the storing so that the data record for respective users of the plurality of users further includes a group identifier attribute value that specifies an enterprise project group association of the user, and a group lexical knowledge level attribute value for the enterprise project group, wherein providing the group lexical knowledge level attribute value for the enterprise project group includes aggregating lexical knowledge level attribute values for group members of the group, wherein the identifying a lexical preference of the recipient includes identifying a group identifier attribute value that specifies an enterprise project group association of the recipient as recorded within the knowledgebase and a group lexical knowledge level attribute value for the recipient as recorded within the knowledgebase, wherein the method includes providing an adapted document adapted from the obtained document obtained from the author for presentment to the recipient using (i) the group identifier attribute value that specifies an enterprise project group association of the recipient as recorded within the knowledgebase, and (ii) group lexical knowledge level attribute value for the recipient as recorded within the knowledgebase so that the adapted document has a complexity level in dependence group lexical knowledge level attribute value for the recipient, the complexity level indicative of a population percentage having familiarity with terms of the adapted document, wherein the method includes presenting the adapted document adapted from the obtained document obtained from the author to the recipient.

15. The computer implemented method of claim 11, wherein the iteratively processing new text based content of the plurality of users includes iteratively updating data records for the users in an historical reactions database, wherein the iteratively updating data records for the users in the historical reactions database for the plurality of users includes differentiating and classifying documents presented to users as well as response messages by users by type of document and recording data including document type classification data on documents reacted to by users and document type classification data of response messages by users, wherein the iteratively updating data records for the users in the historical reactions database for the plurality of users further includes recording in the historical reactions database data indicating reactions to users in reaction to receiving presented documents, wherein the identifying a lexical preference of the recipient with use of the historical reactions database includes (a) determining that the obtained document obtained from author is of a certain type of document and (b) applying a weighing scheme to weigh reaction data of the recipient so that the identified lexical preference of the recipient is more dependent on historical data of the historical reactions database for the recipient associated to documents of the certain type than on historical data of the historical reactions database for the recipient associated to documents other than the certain type.

16. The computer implemented method of claim 11, wherein the obtaining the designation of the recipient includes examining data entered by the author of the obtained document into a user interface, the entered data entered by author into the user interface specifying an identifier of the recipient.

17. The computer implemented method of claim 11, wherein the obtaining the designation of the recipient includes examining data entered by the author of the obtained document into a user interface, the entered data entered by author into the user interface specifying an identifier of the recipient, wherein the method includes subsequent to the selecting one or more comparable term corresponding to one or more term of the document, presenting a first term of the one or more selected comparable term of the obtained document to the author for approval.

18. The computer implemented method of claim 11, the identifying comprising:
discovering past reactions to one or more type of natural language content by the recipient from a historical user reaction database;
determining correlations amongst respective types of the natural language content, respective complexity of terms appearing in the respective types of the natural language content, and respective reactions to each type of the natural language content;
assigning the lexical preference of the recipient with the types of the natural language content and the complexity of terms that respectively corresponding to positive reaction of the recipient.

19. The computer implemented method of claim 11, wherein the lexical preference further comprise a subject and associated knowledge level on the subject of the recipient, wherein terms specifically relevant to the subject is available from a subject terminology database, wherein the subject and the associated knowledge level on the subject of a group to which the recipient is a member is determined by aggregating respective subjects and associated knowledge levels of respective members of the group.

20. A computer program product comprising:
a computer readable storage medium readable by one or more processing circuit and storing instructions for execution by one or more processor for performing a method for cognitively adapting a document for a recipient, comprising:
storing in a knowledgebase for a plurality of users a data record that includes a name attribute value, a subject matter attribute value, a lexical knowledge level attribute value and style attribute value, wherein the lexical knowledge level attribute value for a user is assigned in dependence on a percentage of persons within a population who are familiar with words of a vocabulary of the user;
iteratively processing new text based content of the plurality of users to update the respective data records in the knowledgebase for the plurality of users;
obtaining a document from an author and a designation of a recipient;
identifying a lexical preference of the recipient with use of the knowledgebase, wherein a user record of the knowledgebase includes a record of the recipient;
analyzing the document against the identified lexical preference;
determining with use of the knowledgebase that discrepancies exist between lexical style of the document and the lexical preference of the recipient; and
selecting one or more comparable term corresponding to one or more term of the document, wherein the comparable term has a meaning similar to the term of the document and the comparable term fits the lexical preference of the recipient, wherein a knowledgebase user record of the knowledgebase includes a record of the author,
wherein the method includes ascertaining with use of the knowledgebase that a lexical knowledge attribute value of the author exceeds a lexical knowledge attribute value of the recipient;
responsively to the ascertaining with use of the knowledgebase that the lexical knowledge attribute value of the author exceeds a lexical knowledge attribute value of the recipient, removing terms from the obtained document obtained from the author; and
wherein the removing terms from the obtained document obtained from the author, responsively to the ascertaining with use of the knowledgebase that the lexical knowledge attribute value of the author exceeds a lexical knowledge attribute value of the recipient, includes performing the removing terms of the obtained document obtained from the author to scale down a complexity of the document obtained from the author for presentment of an adapted document to the recipient; and
presenting the adapted document to the recipient.

* * * * *